United States Patent
Antunez, Jr. et al.

(10) Patent No.: US 6,192,916 B1
(45) Date of Patent: Feb. 27, 2001

(54) FLOW-LIMITING FLOAT VALVE

(75) Inventors: Armand E. Antunez, Jr.; Bruce A Antunez, both of Glendora, CA (US)

(73) Assignee: Coast Foundry & Mfg. Co., Pomona, CA (US)

(*) Notice: Subject to any disclaimer, the term of this patent is extended or adjusted under 35 U.S.C. 154(b) by 0 days.

(21) Appl. No.: 09/480,471

(22) Filed: Jan. 10, 2000

(51) Int. Cl.[7] .................................................. F16K 31/26
(52) U.S. Cl. .......................... 137/218; 137/436; 137/441
(58) Field of Search .................................. 137/218, 436, 137/441

(56) References Cited

U.S. PATENT DOCUMENTS

| | | | | |
|---|---|---|---|---|
| 2,635,622 | * | 4/1953 | Owens | 137/218 |
| 3,070,118 | * | 12/1962 | Antunez | 137/436 |
| 3,785,394 | * | 1/1974 | Dixon | 137/218 |
| 3,785,397 | * | 1/1974 | Young | 137/436 X |
| 4,494,562 | * | 1/1985 | Stephens | 137/436 |

* cited by examiner

Primary Examiner—Gerald A. Michalsky
(74) Attorney, Agent, or Firm—Monty Koslover

(57) ABSTRACT

A ballcock type flow-limiting valve for refilling a water tank and commode. A vertical riser has an internal inlet water passage connected to the valve base which has a recess surrounding the inlet seat forming a lower discharge chamber. A removable, dome shaped cap is secured to the valve base, overlaying the recessed area and forming an upper flow chamber. A vertical, free floating piston that controls inlet water flow and shut off is mounted slidingly through a central boss in the cap top and is actuated by an external pivoted arm. The piston and the lower discharge chamber incorporate features designed to limit water inlet flow to the discharge chambers and also to prevent accidental excessive movement of the piston. Provision is included to allow for possible valve blockages due to part swelling or water debris, and to ensure water flow access to the discharge passages for refill. The piston is accessible for servicing or removal by easy removal of the cap.

8 Claims, 3 Drawing Sheets

FLOW-LIMITING FLOAT VALVE

BACKGROUND OF THE INVENTION

1. Field of the Invention

This invention relates to water supply valves, and more particularly to tank ballcock valves that are used to re-supply water to reservoir tanks for domestic commodes.

2. Background

Ballcock valves for refilling water reservoir tanks for domestic commodes have been in use for many years and are well known to the people who install them or replace them. Typically, these valves utilize a plug that is forced down to shut the water inlet by a pivoted arm that is levered by a tank float. The plug and internal valve structure usually include various flexible washers that perform vital functions in controlling valve internal water flow.

Over the past decade that has seen the introduction of fluorides, chlorine and other chemicals into the public water supply, there has been a reported notable increase in valve blockages interfering with proper operation of these valves. Often, the blockage is due to swelling of valve washers caused by chloramines in the water over a time period, the swollen washers then blocking discharge apertures. The only available solution to date has been to replace the plug and thereby the washers. This is usually only a temporary Solution as the blockage will probably re-occur in time.

Valve blockages are also caused by particles that may be floating in the water and blocking small diameter valve apertures, often occurring after work is done nearby on the water mains and the water supply may be temporarily muddy. The valve must then be opened in order to clean out these particles, which may be a time consuming job.

Another occasional problem in ballcock valve operation may arise when water "hammer" occurs in the water supply line. If this should happen during refill when the valve plug or stem is up and the flow chamber is open to inlet water pressure, the valve plug may be forced upwards too high or even out of the valve chamber, resulting in flooding the tank as well as the bathroom area around the toilet. Thus, there remain several ongoing valve operating problems that afflict the typical plug type ballcock valve in use today, resulting in much unavoidable repair and replacement costs. The present invention incorporates a valve design that solves these problems while keeping the familiar attributes of the ballcock valve for acceptance in domestic use.

SUMMARY OF THE INVENTION

The invention is a flow-limiting float valve that is intended particularly for re-supplying water to domestic reservoir tanks and commodes. The valve has attached to its base a vertical riser that has an internal inlet water passage, and which is adapted for mounting to the bottom wall of a reservoir tank for connection to a water supply. The valve is constructed using a dome shaped cap that fits over the base and defines a flow discharge chamber, and a vertical free-sliding piston that controls inlet water flow and shut off. Provision is made to limit the inlet water flow during refill at all times, and to prevent accidental ejection of the piston as may occur during a surge in water pressure.

Provision is also included to allow for possible valve flow blockages by eliminating the potential for rotation of the piston, thus ensuring delivery of discharge water to the valve discharge passage, coupled with a relief recess in the cap of the flow discharge chamber to which a flow notch on the non-rotating float piston directs the discharge water. This will ensure an adequate flow of water to the refill outlet, in the case of the flexible internal washers becoming swollen from chemicals in the water supply.

Accordingly, it is a prime object of this invention to provide a float valve for re-supplying water to domestic reservoir tanks and toilet bowls, that will limit the water flow rate during refill, preventing possible accidental flooding.

Another object of this invention is to ensure discharge water flow access to the valve discharge passages under any possible internal valve water blockage condition including swelling of the flexible internal washers.

A further object is to provide a simplified float valve for dependable operation and having a long useful life. The most important advantages of the present invention over currently available ballcock valve devices are twofold:

(1) In the case of a failure of any part of the regulating mechanisms, the flow through the valve is limited to an amount less than the amount which can be disposed of by the overflow valve that is located at an adjacent point in the toilet tank.

(2) In the case of degradation of the internal flexible washers, the percentage of water flow to the refill tube remains the same as that of a new unaffected inlet valve. Another advantage of this invention is the ease of repairing or replacing the piston, which can be quickly removed without using any tools by removing the easily unlocked valve cap.

Yet another advantage of this invention is its relatively long useful life.

Further objects and advantages of the invention will be apparent from studying the following portion of the specification, the claims and the attached drawings.

DESCRIPTION OF THE PREFERRED EMBODIMENT

Figure 1:
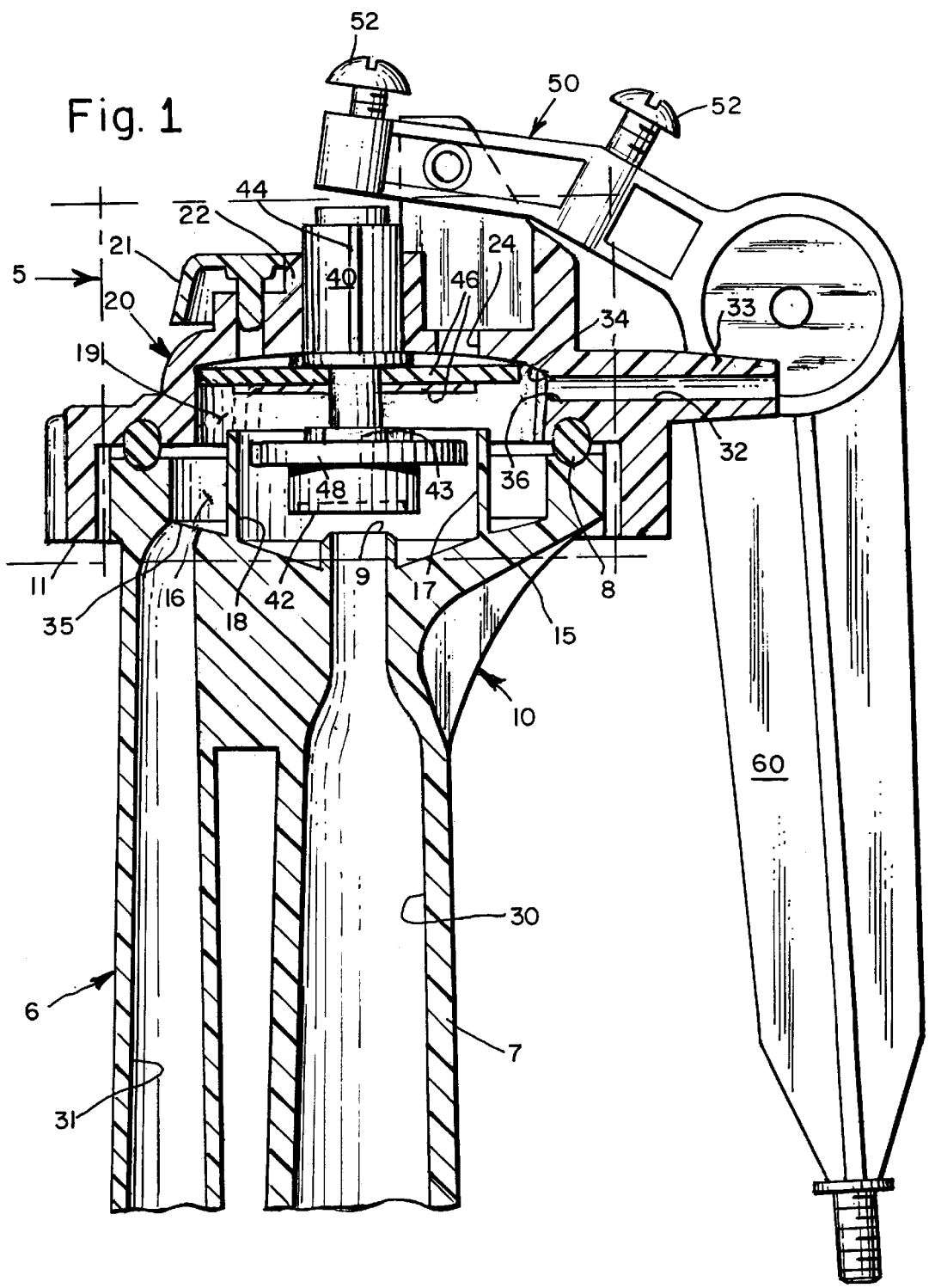
FIG. 1 is an axial cross-section of the preferred embodiment of the invention, particularly showing the action of the float valve piston in a valve-open position.

Referring particularly to the drawings, there is shown in FIG. 1 a sectional view of the valve 5, fully open to incoming water flow for discharging to a tank and a commode bowl for refill. The valve 5 has attached a vertical riser 7 that incorporates an internal inlet water passage 30 and which is adapted for mounting to the water supply at the bottom wall of a water tank. This riser 7 forms the lower part of the valve body 10 together with a base 15. The valve includes also a dome shaped cap 20 which fits over the base 15 defining a flow discharge chamber 19, and a vertical float piston 40. The piston 40 fits vertically in a boss 22 in the top of the cap 20 and controls inlet water flow and shut off by being made to move up and down in the discharge chamber 19.

Figure 2:
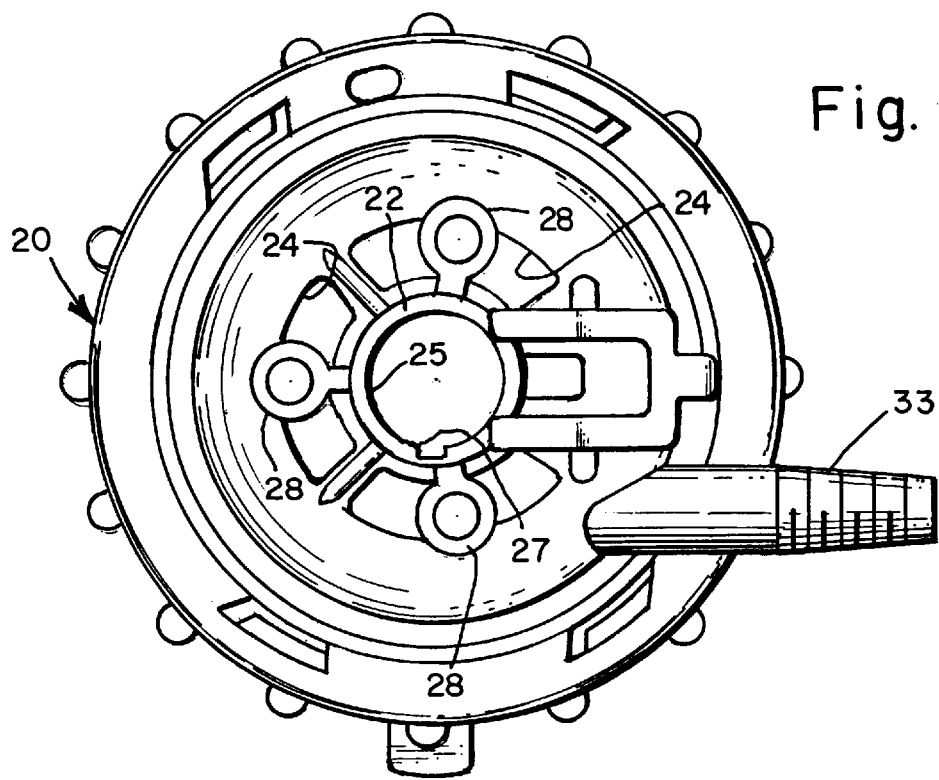
FIG. 2 is a top plan view of a valve cap that provides a dome enclosing a flow chamber, in accordance with the present invention.
Figure 3:
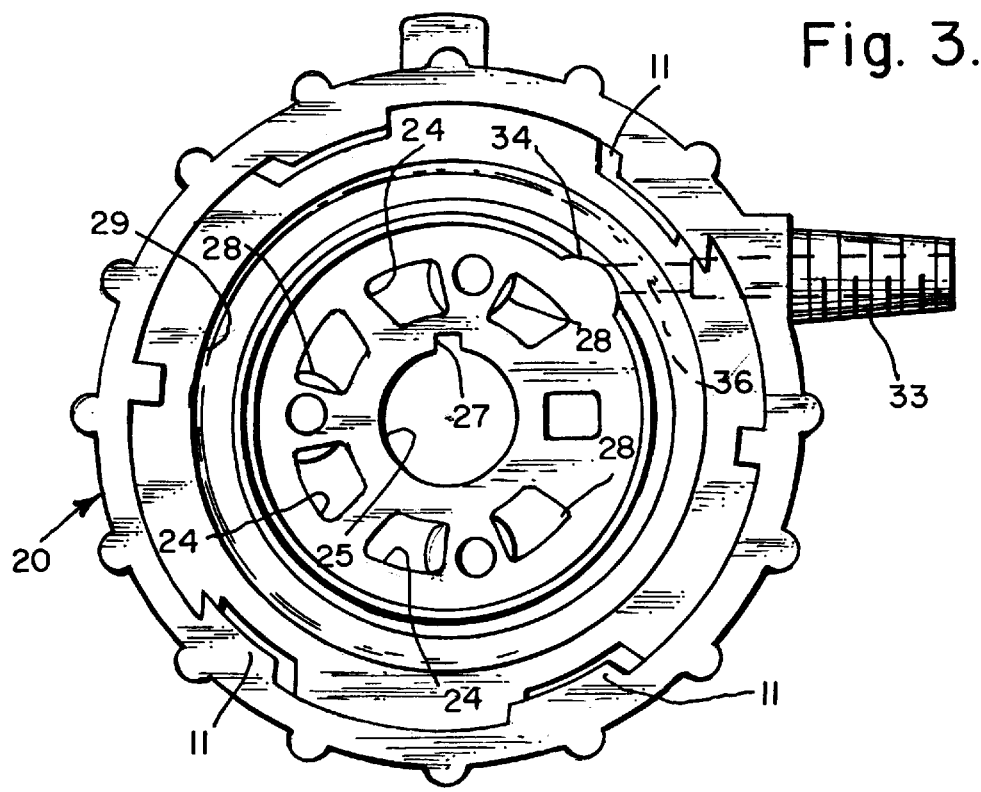
FIG. 3 is a bottom plan view of the valve cap, particularly showing detail of the inner surface of the cap dome and the location of a recess in one side that provides access to a discharge passage opening.
Figure 4:
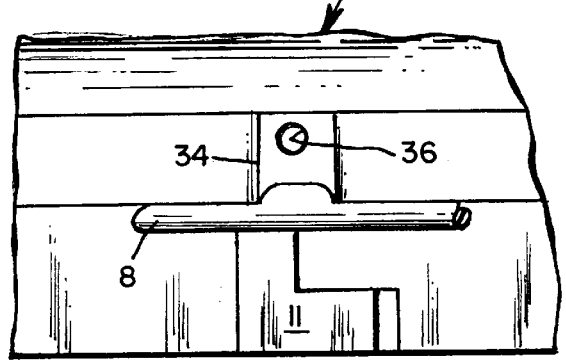
FIG. 4 is an elevation view of part of the inside surface of the valve cap, particularly showing the discharge passage opening for bowl fill and the recess surrounding it.

Refer also now to FIGS. 2, 3 and 4. These figures show aspects of the cap 20 that complement the cap section view shown in FIG. 1 as an aid to clarification of the valve operation. Cap features include a vertical, axially located boss 22 on the cap top, containing a vertical socket 25 sized to permit sliding movement of the piston 40; a number of anti-siphon ports 24 in the top, arranged concentrically around the boss 22; two or more vertical bosses 28 for removably fastening a valve top shield 21, and an attached bowl fill fitting 33. The cap 20 is fastened to the base 15 by a bayonet coupling It for easy removal in servicing. A sealing ring 8 seated in a circular groove 29 in the cap 20 and base 15 provides a water tight seal for the discharge chamber 19 when the cap is fastened to the base 15.

When the valve is open to water flow as depicted in FIG. 1, water exits the inlet passage 30 and flows into the lower portion 18 of the discharge chamber 19 where the flow is restricted by a circular spacer wall 17 rising from the base, inside which is the lower portion of the piston 40 and a retarding disk 48, before it is allowed to flow into the upper portion of the discharge chamber 19 to be discharged.

For water discharge to the tank, a vertical tube 6 having a large opening 35 in a discharge channel 16 formed by the spacer wall 17 in the base 15, is attached to the valve body 10. This discharge channel is supplemented by a horizontal secondary discharge passage 32 for bowl fill which is located in a side of the cap 20, and accessed by a relatively small opening 36 to the discharge chamber 19.

Figure 5:
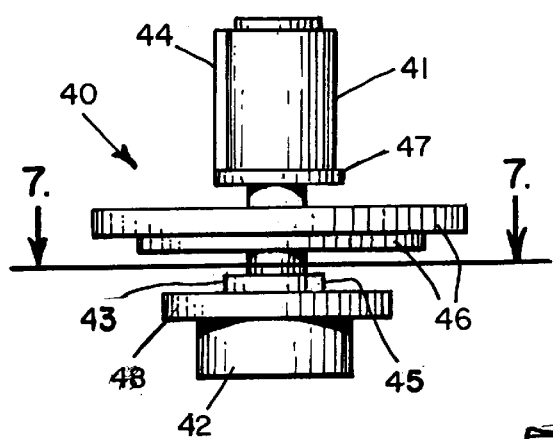
FIG. 5 is an elevation view of the piston assembly.
Figure 7:
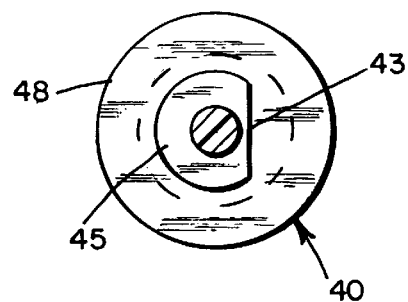
FIG. 7 is cross-section view of the piston assembly taken along line 7—7 of FIG. 5, particularly showing how one side of a retarding disk is cut away to increase and guide water flow.
Figure 6:
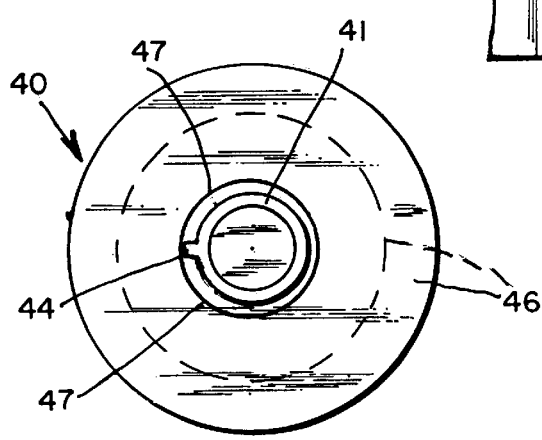
FIG. 6 is a top view of the piston assembly.

In operation, the vertical float valve piston 40 is moved downward by an actuating arm 50 that may be adjusted by two threaded screws 52 and which is connected to a tank float arm 60. The piston 40 is shown as an assembly in the elevation view of FIG. 5, in a top plan view in FIG. 6 and a lower section view in FIG. 7. The piston 40 comprises a piston stem 41, two flexible washers 46 which fit loosely around an annular groove in the central portion of the stem, a relatively stiff, flow retarding disk 48 which fits tightly around an annular groove in the lower portion of the stem, and a conventional compressible washer 42 that fits into the bottom of the stem, for the purpose of bearing against the water inlet seat 9 in the center bottom of the discharge chamber to close the inlet.

A straight edged relief 43 is cut in a side of the lower portion of the stem 41 immediately above the retarding disk 48. This is done to provide a wider channel for water flow on one side of the piston 40 toward the opening 36 of the secondary discharge bowl fill passage 32 that is located in one side of the cap 20.

In order that the relief portion of the piston remains correctly oriented to facilitate water flow, it is necessary that the piston not rotate. This is achieved by providing a vertical spline 44 on a side of the top portion of the stem 41, terminating in a flange 47. The spline 44 keys the stem 41 to a vertical groove 27 in the cap boss 22 socket 25 and prevents the stem 41 from being rotated. The flange 47 is provided to prevent the piston from being forced up too high by pressure of the inlet water.

It has been established that chloramines in the water supply in sufficient concentration, may react with the two flexible washers 46 that slide up the piston 40 stem, causing the washers to swell. Such a swelling could obscure the entry aperture 36 of the secondary discharge passage 32, preventing discharge through the passage 32.

To counter this possibility of washer swelling and to assure access to proper water flow from the discharge chamber 19 to the discharge passage 32, two design actions were taken:

1. The lower of the two washers 46 is made sufficiently thinner and smaller in diameter than the top washer, so that its swelling can not significantly block water flow.

2. A relief 34 recess is cut vertically in the cap 20 wall surrounding the passage opening 36. This relief feature is shown in FIGS. 3 and 4 as well as being indicated in FIG. 1. Water is thus able to flow into the relief and the discharge passage opening 36 even when the relief area in front of the opening 36 is occluded by a swollen washer edge.

A potential problem caused by swelling of the piston washers has thus been avoided.

Referring again to FIG. 1, operation of the float valve piston 40 to limit and regulate water discharge is as follows: When the valve's actuating arm 50 pivots up and releases its pressure on the top of the piston 40, the piston is pushed upwards by inlet water pressure exiting through the inlet seat 9. The piston rises until stopped by a piston flange 47 which bears against the top inside surface of the cap 20 under the boss 22. This places the piston retarding disk 48 within the circular spacer wall 17 near to the wall top edge. Inlet water flow from the riser passage is thus limited by the retarding disk and the space between the disk edge and the spacer wall 17 surface. The retarding disk 48 which is relatively stiff, flexes only a little at its periphery to accommodate applied water pressure.

The inlet water then flows over the spacer wall 17 and into the upper portion of the discharge chamber 19 where the water forces the two floating washers 46 up against the inside roof of the discharge chamber 19 and covering the anti-siphon ports 24 in the cap 20 dome. Simultaneously, water flows from the discharge chamber to the circular main discharge channel 16 into the vertical discharge tube 31 for tank fill, and also horizontally from the chamber into the bowl fill passage 32 opening 36. The horizontal flow is guided and strengthened by the relief 43 in the bottom portion of the piston stem above the retarding disk.

When pressure from the actuating arm 50 forces the piston 40 downwards, the piston head is forced against the inlet seat 9 and shuts off inlet water flow to the discharge chamber. This allows the floating washers 46 to drop and open the discharge chamber to air coming through the cap anti-siphon ports 24, causing all the remaining water in the discharge chamber 19 to exit through the discharge tubes and stopping further discharge.

An advantage of this invention over earlier valves is that the piston can not be forced up too high and cause flooding of the tank and bowl overflow. Another advantage lies in the valve high reliability of dependable operation, particularly in avoiding disruption of water discharge due to blockages. A further advantage is the relative simplicity of the piston construction, its ease of replacement by simply removing the cap, and its relatively low cost of manufacture.

From the above description, it is clear that the preferred embodiment of the flow-limited float valve device achieves the objects of the present invention. Alternative embodiments and various modifications may be apparent to those skilled in the art. These alternatives and modifications are considered to be within the spirit and scope of the present invention and are encompassed thereby.

Having described the invention, what is claimed is:

1. In a water flow control device of the type used for maintaining a supply of water in a reservoir tank and toilet bowl, said flow control device including a vertical riser extending along a vertical axis, a water supply passage extending axially through said riser, a tank filler tube extending along a vertical axis, and a valve actuating arm that is pivotably attached to a top portion of said device, a flow-limiting float valve comprising:

(a) a cup shaped base, said vertical riser being attached to the bottom surface of said base at its proximate center, said water supply passage being extended upward through the center of said base and having a projecting circular wall forming an inlet seat; said base having a circular, peripheral spacer rising from the inner surface of said base, concentric with and rising above said inlet seat, forming an inlet flow chamber around said inlet seat and a circular discharge channel around said spacer, said discharge channel having a first discharge opening at one point in its periphery, said tank filler tube having an end attached to the bottom of said base and extending to said first discharge opening; said base including a first circular groove formed in the top surface of its peripheral walls, said groove being shaped to seat a water sealing ring;

(b) a sealing ring for sealing said valve from water leakage, said sealing ring being sized to fit in said first circular groove in said base;

(c) a valve cap, said cap having a generally cylindrical, open lower portion and an upper portion having a shallow, central dome, said cap being sized and shaped to fit over said base and be locked in place, forming an internal flow discharge chamber; said upper portion having a centrally Located boss enclosing a vertical axial bore, projecting vertically above and through said dome, and including a pivotal mounting means for said valve actuating arm located to place a free end of said actuating arm directly over said boss and said axial bore, said upper portion including a bowl-fill fitting that is attached to said dome and projecting horizontally, and a multiplicity of apertures cut in said dome around said boss to serve as anti-siphon ports, said bowl-fill fitting having an axial internal passage with a second discharge opening in the inner wall of said dome; said lower portion including a second circular groove in its inside surface, located to be opposing said first circular groove in said base and sized to seat said sealing ring;

(d) means for removably locking said cap in place on said base;

(e) a generally cylindrical valve piston that fits in said bore in said cap, said piston extending its top end partly above said boss and extending below into said flow chamber, including a head at its distal end for bearing against said inlet seat to shut off inlet water flow, said piston comprising an upper portion, a middle stepped portion and a lower portion; said upper portion fitting slidingly in said bore and including means for limiting upward movement of said piston to a maximum "valve open" position, said middle stepped portion including a flexible first disk washer and a second disk washer able to move slidingly up and down said stepped portion, said lower portion including a relatively rigid, flow retarding disk in a fixed position, said retarding disk being located such that when said piston is at its uppermost position, said retarding disk is at or just below the top of said circular spacer around said inlet seat, leaving a small space between the peripheral edge of said retarding disk and said circular spacer, thereby retarding and limiting water flow out of said inlet flow chamber;

(f) means for preventing rotation of said piston in said cap;

(g) a valve top cover providing a spray shield above said anti-siphon ports in the dome of said cap; and (h) means for removably attaching said top cover to the top of said cap leaving a space between them;

said piston being pushed down by an end of said actuating arm resulting in the piston head end bearing against and covering said inlet seat to shut off water inlet flow; said piston floating upwards when actuating arm pressure is released, regulating water flow into said discharge chamber and thereby into said tank filler tube and into said bowl-fill fitting for filling, preventing accidental overflow, said piston able to slide out of said bore in said cap for repair when said cap is removed from said base.

2. The float valve as defined in claim 1, wherein:

said means for removably locking said cap in place on said base includes a multiplicity of bayonet couplings formed on the periphery of said lower portion of said cap interacting with mating projections on the outer perimeter of said base.

3. The float valve as defined in claim 1, wherein:

said piston includes first means for guiding and enhancing water flow towards said second discharge opening in said dome, said first means including a straight edged relief cut in the side of the lower portion of said piston that is above said retarding disk, said relief being oriented on said piston in a direction to widen the horizontal water channel leading toward said second discharge opening, thereby lowering resistance to water flow toward said second discharge opening.

4. The float valve as defined in claim 1, wherein:

said means for preventing rotation of said piston in said cap includes a vertical groove in the surface of said bore in said boss, interacting with a vertical spline projecting from the surface of said upper portion of said piston, said spline fitting slidingly in said groove, permitting said piston to move easily up and down while preventing rotation and keeping said lower portion of said piston oriented in a position for increasing horizontal water flow.

5. The float valve as defined in claim 1, wherein:

said cap includes a relief recess cut in the inner wall surface of said dome immediately around said second discharge opening, said relief recess providing water flow access to said second discharge opening in the event of the area in front of said opening being occluded by a swollen disk or debris.

6. The float valve as defined in claim 1, wherein:

said first disk washer on said piston is sized in diameter to cover said anti-siphon ports when said piston is at its highest valve open position, said second disk washer having a smaller diameter than said first disk washer to reduce or eliminate potential flow blockage problems due to any washer swelling.

7. A ball cock valve device for controlling and limiting supply of water to a toilet storage tank and toilet bowl, comprising a valve base mounted on a vertical riser having an internal water supply passage, a dome shaped cap removably fastened to said base forming a flow chamber therein, and a first recess in the bottom of said base defining a downward extension of said flow chamber, a valve inlet seat projecting upward from the center bottom of said first recess, a wide circular groove in said base concentric with said first recess, serving as a discharge channel and having a first opening for filling said tank, a bowl-fill fitting attached horizontally to said cap and incorporating an internal passage having a second discharge opening into said flow chamber for filling said toilet bowl, a rigid, generally cylindrical float piston having a top portion fitting vertically and slidably into the underside of said cap and having a middle portion and a bottom portion extending into said flow chamber and into said first recess above said inlet seat, said bottom portion having a head for bearing against said inlet seat to stop water inlet flow, said bottom portion including a rigid flow retarding disk located so that when said piston is at its maximum height open above said inlet seat, said retarding disk is inside the walls of said first recess and retarding inlet flow of water between the peripheral edge of said retarding disk and first recess, means for sealing said flow chamber against water leaks, means for removably fastening said cap to said base, a multiplicity of apertures in the top of said cap serving as anti-siphon ports, means for channeling horizontal water flow in said flow chamber, means for covering said anti-siphon ports when said flow chamber is discharging water, means for preventing rotation of said piston in said cap, means for preventing said piston from being forced upward out of said cap and out of said first recess, a cover removably attached to the top of said cap over said anti-siphon ports and acting as a spray shield, a vertical tank filler tube attached to said base and connected to said discharge channel, and a valve actuator arm pivotably mounted to the top of said cap for providing pressure on the top of said piston when said tank is full and inlet flow must be stopped, said valve device limiting the flow of water supplied to said tank and bowl at all times during refill, preventing accidental overflow, said piston able to slide out of said cap for repair when said cap is removed from said base.

8. The device according to claim 7 including a relief recess cut in the inside wall of said cap around said second discharge opening for filling said bowl, said relief recess providing water access to said second discharge opening in the event of blockage immediately in front of said discharge opening.

* * * * *